United States Patent
Pilon et al.

(10) Patent No.: US 10,962,448 B2
(45) Date of Patent: *Mar. 30, 2021

(54) METHOD FOR MONITORING THE ENGINES OF AN AIRCRAFT

(71) Applicant: Airbus Operations SAS, Toulouse (FR)

(72) Inventors: Antoine Pilon, Saint-Lys (FR); Natalino Agostino, Tournefeuille (FR); Adrien Pierrel, Plaisance du Touch (FR)

(73) Assignee: Airbus Operations SAS, Toulouse (FR)

(*) Notice: Subject to any disclaimer, the term of this patent is extended or adjusted under 35 U.S.C. 154(b) by 166 days.

This patent is subject to a terminal disclaimer.

(21) Appl. No.: 16/225,285

(22) Filed: Dec. 19, 2018

(65) Prior Publication Data

US 2019/0128780 A1    May 2, 2019

Related U.S. Application Data

(63) Continuation-in-part of application No. 15/621,416, filed on Jun. 13, 2017, now Pat. No. 10,254,199.

(30) Foreign Application Priority Data

Jun. 17, 2016    (FR) ..................... 1655650

(51) Int. Cl.
*G01M 15/14*    (2006.01)
*B64D 45/00*    (2006.01)
(Continued)

(52) U.S. Cl.
CPC ............. *G01M 15/14* (2013.01); *B64D 45/00* (2013.01); *F02D 41/1446* (2013.01);
(Continued)

(58) Field of Classification Search
CPC .......... F05D 2270/335; F05D 2260/80; F05D 2270/303; F05D 2270/334; F02D 41/1446;
(Continued)

(56) References Cited

U.S. PATENT DOCUMENTS

| | | | |
|---|---|---|---|
| 2002/0120375 A1 | 8/2002 | Draoullec et al. | |
| 2009/0306839 A1* | 12/2009 | Youngquist | G01K 15/00 701/14 |
| 2010/0138132 A1* | 6/2010 | Apps | G07C 3/08 701/100 |
| 2012/0191427 A1* | 7/2012 | Cianflone | F02D 41/0007 703/2 |

(Continued)

FOREIGN PATENT DOCUMENTS

| | | | | |
|---|---|---|---|---|
| CA | 2799933 A1 * | 8/2013 | ................ | F02C 7/00 |
| CA | 2865181 A1 * | 8/2013 | ................ | B64F 5/60 |
| FR | 2821452 | 8/2002 | | |

OTHER PUBLICATIONS

French Search Report, dated Feb. 15, 2017, priority document.

*Primary Examiner* — Atul Trivedi
(74) *Attorney, Agent, or Firm* — Greer, Burns & Crain, Ltd

(57) ABSTRACT

A monitoring method, the purpose of which is, when a loss of power is detected in an aircraft engine, to generate an alarm in the form of a single message displayed on a display screen in the cockpit, in order to indicate if the level of damage suffered by the engine is critical or not. The steps implemented are based on alarm signals transmitted by a central processing unit of the engine and also on alarm signals transmitted by a diagnostic device for the onboard systems of the aircraft, in order to take account of both the situation of the engine and also the situation of the systems surrounding the engine which can be affected by damage to an engine.

13 Claims, 4 Drawing Sheets

(51) Int. Cl.
    *F02D 41/22* (2006.01)
    *G05B 23/02* (2006.01)
    *G07C 5/08* (2006.01)
    *F02C 9/00* (2006.01)
    *F02D 41/14* (2006.01)

(52) U.S. Cl.
    CPC ......... *F02D 41/22* (2013.01); *G05B 23/0235*
        (2013.01); *G07C 5/085* (2013.01); *B64D*
        *2045/0085* (2013.01); *F02C 9/00* (2013.01);
        *F02D 2041/228* (2013.01); *F02D 2200/025*
        (2013.01); *F05D 2260/80* (2013.01); *F05D*
        *2270/303* (2013.01); *F05D 2270/334*
        (2013.01); *F05D 2270/335* (2013.01); *G05B*
        *2219/45071* (2013.01)

(58) Field of Classification Search
    CPC ............... F02D 41/22; F02D 2041/228; F02D
        2200/025; G05B 2219/45071; G05B
        23/0235; G07C 5/085; G01M 15/14;
        F02C 9/00; B64D 2045/0085; B64D
        45/00
    USPC .......................................................... 701/14
    See application file for complete search history.

(56) References Cited

U.S. PATENT DOCUMENTS

| | | | |
|---|---|---|---|
| 2013/0067994 A1* | 3/2013 | Worden | F01P 11/18 73/40.5 R |
| 2013/0073175 A1* | 3/2013 | Banerjee | B60K 6/46 701/102 |
| 2013/0096699 A1* | 4/2013 | Sundaram | G05B 15/02 700/79 |
| 2013/0199204 A1* | 8/2013 | Camhi | F02C 9/00 60/779 |
| 2014/0129111 A1* | 5/2014 | Schaeffer | F02C 9/46 701/100 |
| 2016/0010494 A1* | 1/2016 | Erlund | F02C 9/28 60/773 |
| 2016/0252019 A1* | 9/2016 | Joshi | F02C 9/20 60/776 |
| 2017/0089577 A1* | 3/2017 | DeSilva | F02C 7/266 |
| 2017/0114660 A1* | 4/2017 | James | F02D 41/26 |
| 2017/0260871 A1* | 9/2017 | Schmidt | G01N 29/48 |
| 2017/0345318 A1 | 11/2017 | Kim et al. | |
| 2017/0363514 A1* | 12/2017 | Pilon | F02D 41/22 |
| 2018/0357840 A1* | 12/2018 | Gansler | B64D 35/08 |
| 2018/0370651 A1* | 12/2018 | Miller | B64D 27/24 |
| 2019/0017409 A1* | 1/2019 | Yardibi | F02C 9/00 |
| 2019/0063747 A1* | 2/2019 | Mollmann | F01D 25/04 |
| 2019/0090800 A1* | 3/2019 | Bosworth | B64C 13/02 |
| 2019/0352002 A1* | 11/2019 | Schulte | B64D 45/00 |

* cited by examiner

METHOD FOR MONITORING THE ENGINES OF AN AIRCRAFT

CROSS-REFERENCES TO RELATED APPLICATIONS

This application is a continuation-in-part of U.S. application Ser. No. 15/621,416 filed on Jun. 13, 2017, which claims the benefit of the French patent application No. 1655650 filed on Jun. 17, 2016, the entire disclosures of which are incorporated herein by way of reference.

BACKGROUND OF THE INVENTION

The invention relates to a method for monitoring the engines of an aircraft making it possible to inform the crew of the state of the engines of the aircraft.

Commercial aircraft comprise a monitoring device ("ECAM" standing for "Electronic Centralized Aircraft Monitor" or "EICAS" standing for "Engine Indicating and Crew Alerting System) connected to different sensors installed on systems/engines of the aircraft in order to inform the pilots, via messages (a message of the alarm type) displayed on an alarm screen in the cockpit, of the existence of a malfunction of the systems/engines. When several alarm messages relating to an engine are displayed, the pilots of the aircraft must rapidly assess the operational situation by reading the different messages displayed on the alarm screen and decide whether or not to shut down the engine (in the case of a shut down engine, the pilots will be able to use the propulsion provided by the other engines in order to land the aircraft).

SUMMARY OF THE INVENTION

A purpose of the invention is to provide improved assistance in the process of deciding whether or not to shut down an engine.

For this purpose, the invention relates to a method for monitoring the engines of an aircraft comprising at least two engines, a central processing unit associated with each engine and configured for measuring the temperature of the exhaust gasses of the engine and an amplitude of vibrations of at least one rotor of the engine and the power of the engine, a plurality of onboard systems, a diagnostic device for the onboard systems of the aircraft configured for measuring the value of at least one parameter of at least one onboard system of the aircraft, a display screen and a monitoring device connected to each of the central processing units and to the diagnostic device and to the screen, the method being implemented by the monitoring device, for each engine, the monitoring device generating, if a loss of power of the engine is detected and if one of two conditions A or B is met, a signal indicative of severe damage of the engine, a message according to which an engine has suffered severe damage being displayed on a display screen on transmission, by the monitoring device, of the signal indicative of severe damage of the engine, where:
condition A is met if at least: the value of at least one parameter of at least one onboard system of the aircraft is outside of an acceptable range of values; and
condition B is met if a mechanical anomaly of the engine is detected OR if at least two of the following are met: the temperature of the exhaust gases of the engine is in excess of a predetermined value, an amplitude of vibrations of at least one rotor of the engine is in excess of a predetermined value, and a compressor stall of the engine is detected.

Thanks to the invention, the pilots can, by reading a single message, and no longer a plurality of successive messages, rapidly appreciate the state of an engine and assess the extent of a malfunction of the engine.

BRIEF DESCRIPTION OF THE DRAWINGS

The features of the invention mentioned above, as well as others, will appear more clearly on reading the following description of example embodiments, the description being given with reference to the appended FIG. 1.

DETAILED DESCRIPTION OF THE PREFERRED EMBODIMENTS

Figure 1:
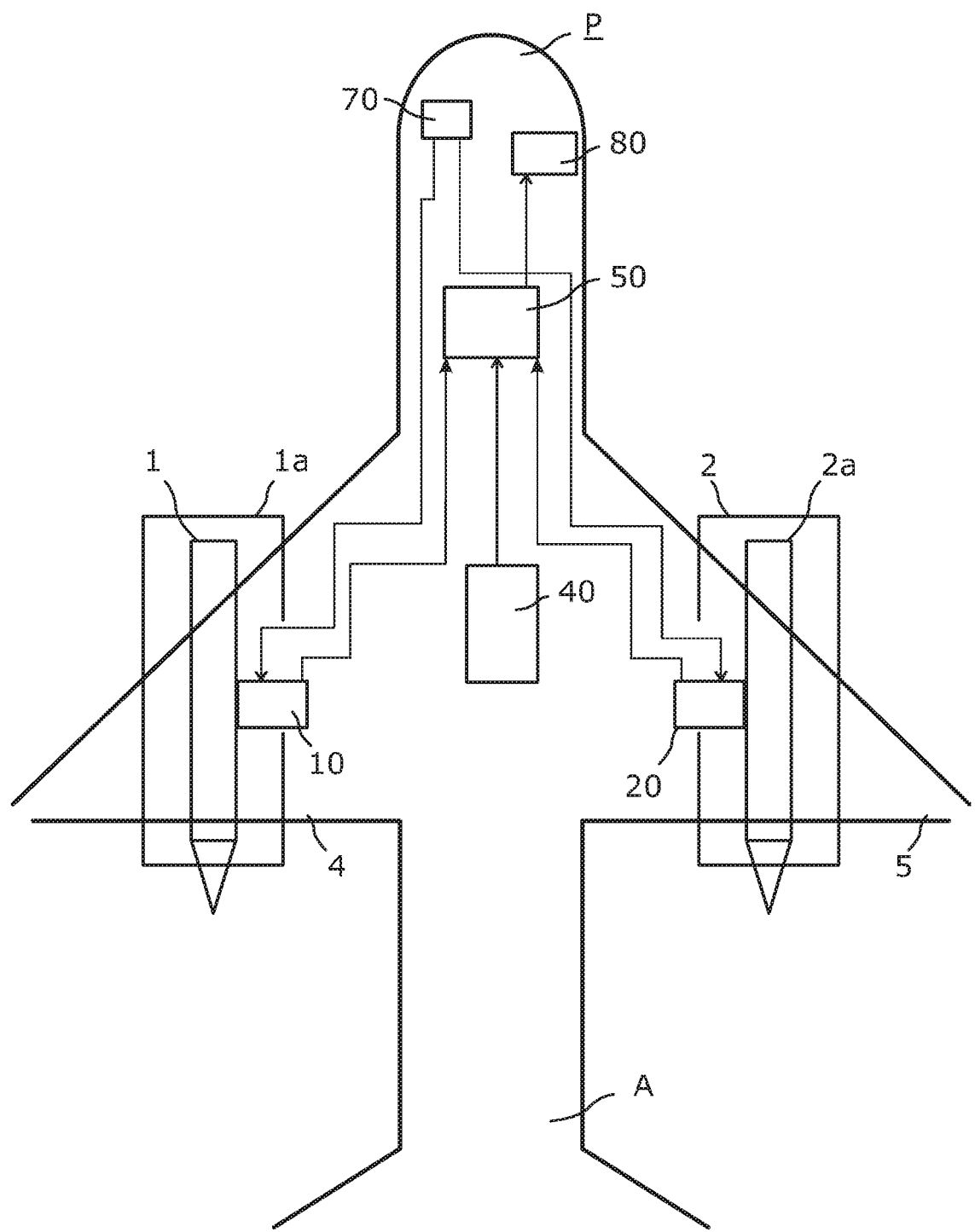
FIG. 1 is a diagrammatic view of an aircraft according to one embodiment of the invention, the aircraft comprising two engines and a monitoring device connected to a central processing unit of each of the engines and to a diagnostic device of the systems of the aircraft.

With reference to FIG. 1, the aircraft A comprises two engines 1, 2 each of which is arranged in a nacelle 1a, 2a fixed, for example, under a wing 4, 5 of the aircraft, a central processing unit 10, 20 (of the "FADEC," standing for "Full Authority Digital Engine Computer", type: engine interface system) associated with each engine 1, 2 in order to control the engine, a diagnostic device for onboard systems (excluding engines) of the aircraft 40, called a diagnostic device, a monitoring device 50 (for example of the ECAM or EICAS type) dedicated to the generation of warnings to the crew in the case of failure of one of the engines of the aircraft and which is connected to the central processing unit 10, 20 of each of the engines 1, 2 and to the diagnostic device 40 and, finally, a cockpit P comprising at least one display screen 80 for displaying the warnings, in the form of messages, generated by the monitoring device, and a man-machine interface 70 for controlling the engines connected to the central processing units 10, 20.

According to the invention, the monitoring device 50 (of the central processing unit type) implements logic whose purpose is, when a loss of power is detected in an engine, to generate a message displayed on the display screen 80 indicating if the level of damage suffered by the engine is critical or not. The logic used is based on alarms transmitted by the central processing unit 10, 20 of the engine, in order to take account of the state of the engine, and also of alarms transmitted by the diagnostic device 40 in order also to take account of the state of onboard systems which may also be damaged as a result of a problem encountered on the engine (for example: blade debris projected outside of the engine and damaging different onboard systems surrounding the engine).

In a known way, the central processing unit 10, 20 associated with each engine 1, 2 controls the performance of the engine by managing the operation of the engine as a function of the values of command instructions from the crew and of values of parameters of the engine measured by an array of sensors installed on the engine or its components installed in the nacelle 1a, 2a (oil pumps, fuel pump, etc.).

The array of sensors associated with an engine 1, 2 or its components notably comprises sensors of the amplitude of vibrations of different parts of the engine such as the rotors of the compressors or of the turbines, and sensors of the temperature of the exhaust gasses (called EGT temperature).

The central processing unit 10, 20 of each engine 1, 2 sends, for each parameter measured, a state signal to the monitoring device 50.

This signal is, for example, a Boolean which when set to 1 indicates an abnormal state (alarm). Thus, for example, for the temperature of the exhaust gasses, the central processing unit 10, 20 of an engine X (where X is equal to 1 for the engine 1 or X=2 for the engine 2) transmits, to the monitoring device 50, a Boolean signal S_EGT(X) set to 0 when the temperature of the exhaust gasses of the engine X is within an acceptable range of values, and set to 1 when the temperature is higher than the upper limit of the range. With regard to the amplitudes of vibrations, the central processing unit 10, 20 of the engine X transmits, for each rotor monitored, a Boolean signal S_Vib(X)N(Y) (where Y is the number of the rotor in the engine X, for example, Y equal 2 for rotor N2 of the compressor) set to 0 when the amplitudes of the vibrations are less than or equal to a maximum acceptable value, and set to 1 when the amplitudes are greater than the acceptable value.

The diagnostic device 40 collects the values of the different parameters resulting from measurements carried out by sensors arranged on the onboard systems of the aircraft A, and compares these values with acceptable values in order derive therefrom the state of health of the systems. The onboard systems monitored by the diagnostic device are those whose operation can be impacted by an incident on an engine 1, 2, for example, because of an engine fire or an engine explosion projecting vane or blade debris. The onboard systems are, for example: the nacelles, the fuel circuit, the hydraulic circuit, the cabin, the pneumatic generation circuit of the aircraft, an electronic power circuit of the aircraft, etc.

By way of example, the parameters taken into account for these systems are, for example:
for the fuel or hydraulic circuit: a flow rate or a liquid level measured by mechanical sensors and making it possible to detect a leak of liquid like kerosene or like hydraulic fluid; such a leak being able to be due to the piercing of a pipe or of a tank by engine debris consecutive to a problem with an engine;
for an electronic power circuit; voltages or currents measured by electronic sensors. The measurements of voltages and of currents make it possible, for example, to detect short-circuits in electrical circuits which have possibly been impacted by a fire or whose components are damaged following an explosion of a blade/vane of an engine;
for the nacelles 1a, 2a: temperatures inside the nacelle 1a, 2a of an engine, measured by temperature sensors. The temperature measurement makes it possible to detect a fire causing a sudden rise of a temperature, the fire being able to have been initiated following a problem with an engine (for example: fuel leakage set on fire because of a short circuit caused by engine debris or by a piercing of the engine casing);
for the cabin: the pressure measured by pressure sensors. A loss of pressure being able to result from an engine explosion with debris piercing the skin of the fuselage; and
for the pneumatic generation circuit of the aircraft: temperatures in the pneumatic generation circuit of the aircraft, measured by temperature sensors. Such a measurement makes it possible to detect a leakage in a hot air circuit of an engine or of the aircraft being able to have been caused by debris having damaged the circuit.

These parameters are mentioned by way of example but other parameters of other systems such as, for example, indications of the position of the flaps or of the leading edge slats, or indications of the position of thrust reversers of an engine can be taken into account.

The diagnostic device 40 sends, for each measured parameter, a state signal to the monitoring device 50. This signal is, for example, a Boolean.

Thus, for example:
for the liquid leaks, the diagnostic device 40 transmits a Boolean signal S_Fuelleak set to 0 when no kerosene leak is detected, and set to 1 otherwise, and a Boolean signal S_Hydroleak set to 0 if no leak of hydraulic fluid is detected and set to 1 otherwise;
for the current/voltage measurements, the diagnostic device transmits a Boolean signal S_Current(X) set to 1 when a short-circuit is detected in electronic circuits of a predetermined zone located around the engine X, and set to 0 otherwise;
for the temperature measurements in the nacelle of the engine X, the diagnostic device 40 transmits a Boolean signal S_Smoke(X) set to 0 when the temperature in the nacelle of the aircraft has a value within an acceptable range of values, and set to 1 otherwise;
for the cabin pressure measurements, the diagnostic device transmits a Boolean signal S_Pressurecabine set to 0 when the cabin pressure has a value within an acceptable range of values (varying as a function of altitude), and set to 1 otherwise.
for the temperature measurements in the pneumatic generation circuit of the aircraft, the diagnostic device transmits a Boolean signal S_Cool set to 0 when the temperature in the circuit has a value within an acceptable range of values, and set to 1 otherwise.

The monitoring device 50 is an electronic device of the central processing unit type, for example installed in an avionics bay (not shown) of the aircraft A. The monitoring device 50 implements a similar logic for both engines 1, 2 using as inputs the signals transmitted by the central processing units 10, 20 of the engines and by the diagnostic device 40.

It should be noted that certain signals transmitted by the diagnostic device 40, such as the signals relative to the pressure in the cabin or the signals relative to the temperature of the pneumatic generation circuit of the aircraft, or the signals relative to liquid leaks are not related to a particular engine. Such signals are therefore used in the logic implemented by the monitoring device 50 for one or other of the engines 1, 2. On the other hand, the signals related to a particular engine, such as, for example, the signal relative to the temperature in the nacelle of the engine, are used only for the logic of the monitoring device 50 for that engine.

Figure 2:
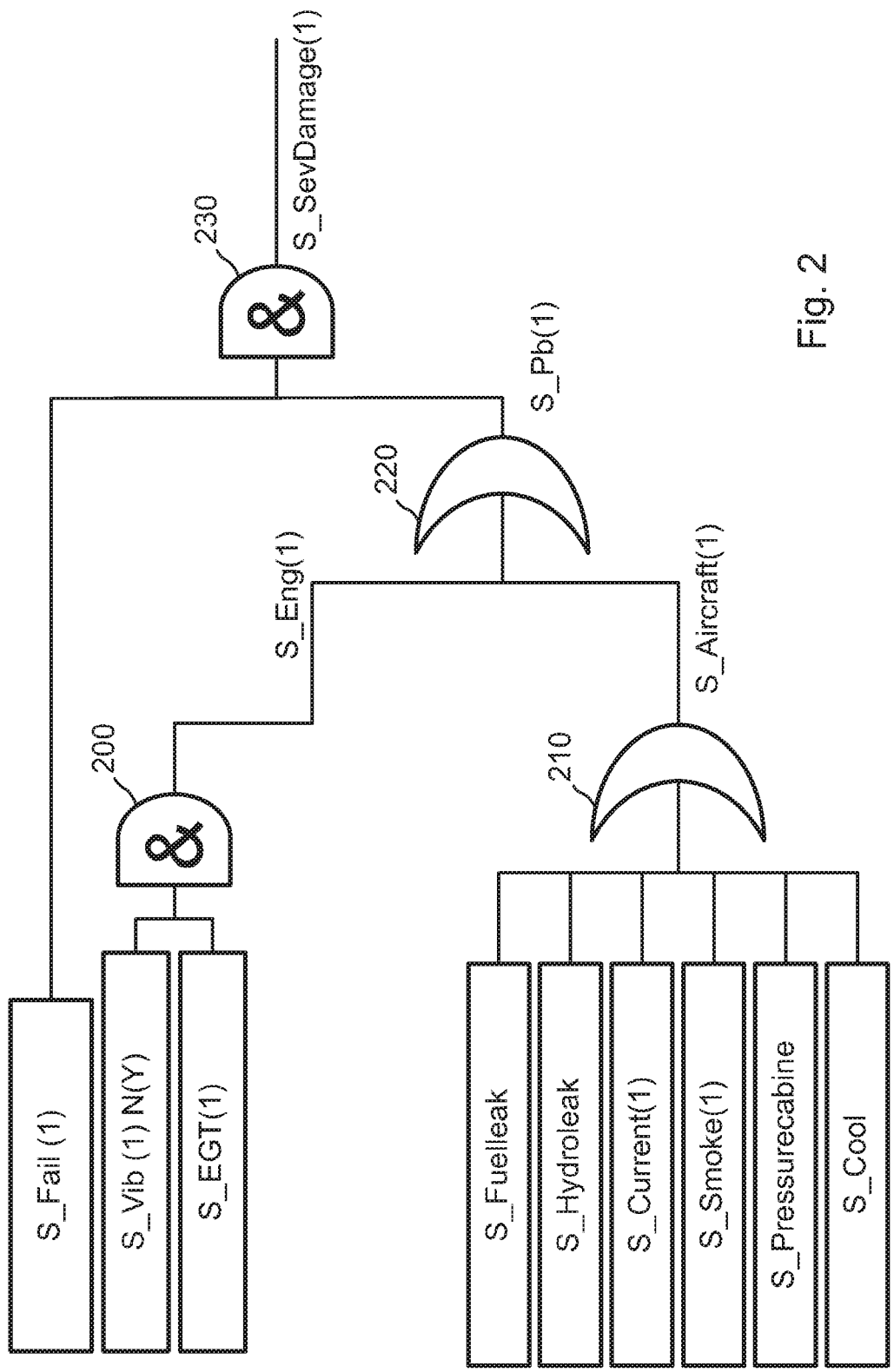
FIG. 2 is a diagram of monitoring logic for an engine implemented by the monitoring device according to one embodiment of the invention.

With reference to FIG. 2, and for the engine 1, an example of Boolean logic implemented by the monitoring device 50 is as follows:

- the monitoring device 50 receives a so-called fail signal, S_Fail(1), transmitted by the central processing unit 10 of the engine 1. This signal is set to 1 when the unit 10 detects a loss of power of the engine 1, and to 0 otherwise. Loss of power of an engine 1, 2 is understood to mean a thrust delivered by the engine which is below a set value (entered via the man-machine interface 70) of thrust desired by the crew. A loss of power will be detected by the central processing unit of an engine, for example when the engine 1, 2 produces only 20% of power while the value of thrust set by the crew is greater than 20%, for example, 60%.
- the monitoring device 50 receives, from the central processing unit 10, the signals S_EGT(1) and S_Vib(1)N (Y) respectively relevant to the exhaust gasses temperature of the engine 1 and to the amplitude of the vibrations of at least one rotor of the engine 1. A signal S_Eng(1) is formed as being the output of a logic AND gate 200 having as its inputs the signal S_Vib(1)N(Y) (whatever Y) and the signal S_EGT(1). The alarm signal S_Eng(1) is thus set to 1 when the values of amplitudes of vibrations of at least one rotor and the value of the exhaust gasses temperature are abnormal.
- the monitoring device 50 receives, from the diagnostic device 40, the signals S_Fuelleak, S_Hydroleak, S_Current(1), S_Smoke(1), S_Presscabine and S_Cool. An alarm signal S_Aircraft(1) is formed as being the output of a logic OR gate 210 having as its inputs the signals S_Fuelleak, S_Hydroleak, S_Current (1), S_Smoke(1), S_Presscabine and S_Cool.

This signal S_Aircraft(1) is thus set to 1 if at least one of the signals transmitted by the diagnostic device 40 to the monitoring device 50 is set to 1.

The output signal of the logic implemented by the monitoring device 50 for the engine 1 is a state signal S_Sevdamage(1) of the engine 1 which is indicative, when set to 1, of a situation of severe damage of the engine 1. The signal S_SevDamage(1) is the output of a logic AND gate 230 receiving at its inputs the signal S_Fail(1) and a signal S_Pb(1), the signal S_Pb(1) being the output of a logic OR gate 220 receiving as its inputs the signal S_Aircraft(1) and the signal S_Eng(1).

The signal S_Sevdamage(1) is thus set to 1 when the central processing unit 10 detects a loss of power of the engine 1 and when the central processing unit 10 or the diagnostic unit 40 transmits an alarm on one of the monitored parameters. When the signal S_Sevdamage(1) is set to 1, the monitoring device 50 sends a command signal (instructions) to the display screen 80 so that the latter indicates, via a message, that the engine 1 has suffered severe damage.

It will be noted that the same logic, with modification of the indicative of the engine, is implemented for the engine 2, even though this has not been shown.

Thanks to the invention, the pilots can, by reading a single message, and no longer a plurality of successive messages, rapidly appreciate the situation of an engine 1, 2 when a loss of power occurs and quickly make a decision with regard to shutting down the engine or not.

Figure 3:
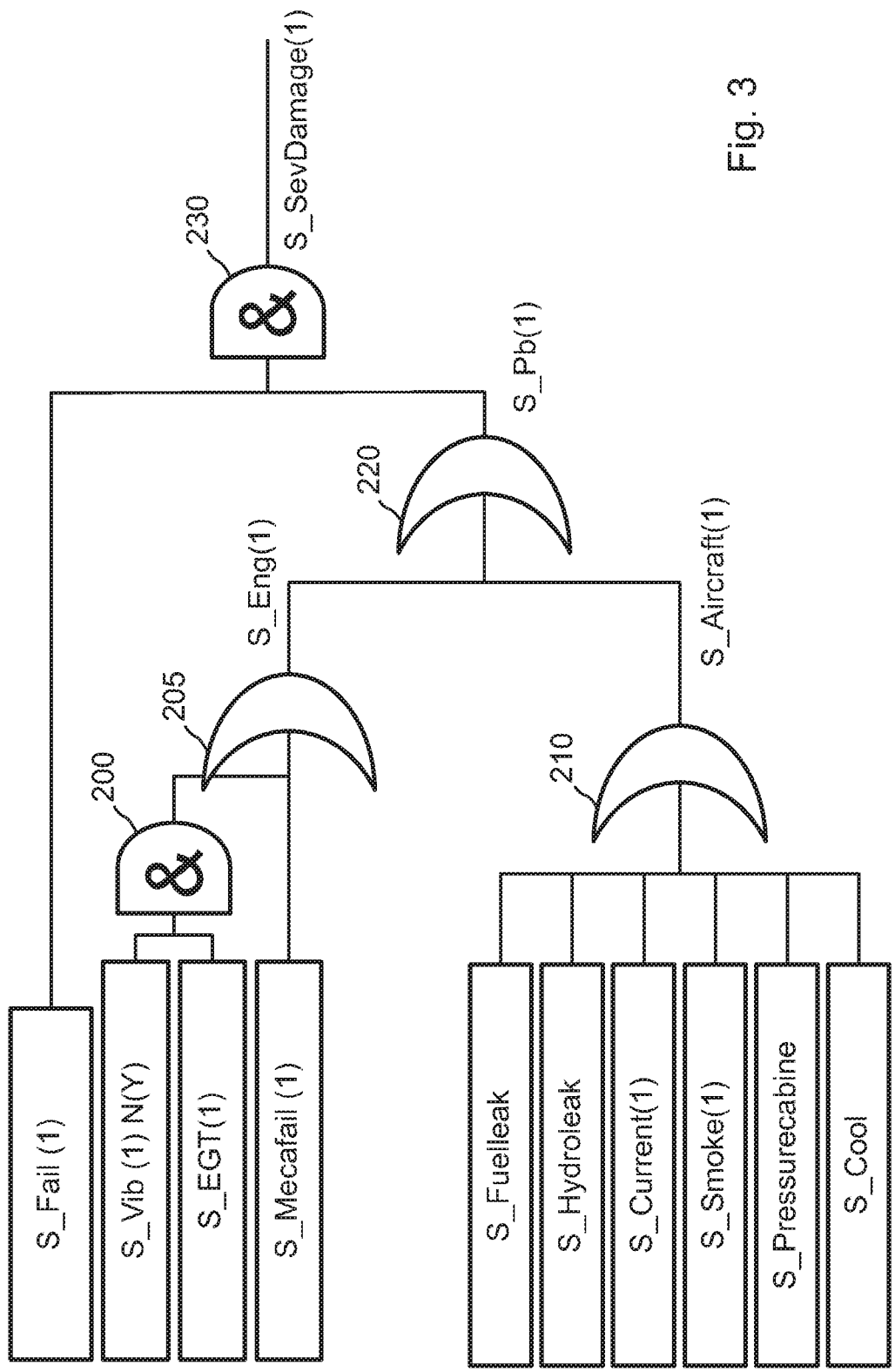
FIG. 3 is a view similar to that of FIG. 2, showing monitoring logic for an engine implemented by the monitoring device according to another embodiment of the invention; and, FIG. 4 is a view similar to that of FIG. 3, showing monitoring logic for an engine implemented by the monitoring device according to another embodiment of the invention.

In a variant embodiment of the invention, the logic as described can be modified so that the central processing unit 10, 20 of each engine 1, 2 takes into account parameters other than the amplitudes of the vibrations of the rotors or the temperature of the exhaust gasses. Thus, as shown in FIG. 3, the central processing unit 20 of the engine 1 sends, to the monitoring device 50, a signal S_Mecafail(1) which is indicative, when it is set to 1, of a mechanical anomaly encountered by the engine 1. This signal S_Mecafail(1) is, for example, indicative of an anomaly on a transmission shaft or of damage of the fan rotor of the engine 1 because of a bird strike.

According to this variant, the signal S_Eng(1) is the output of a logic OR gate 205 having as its inputs the signal S_Mecafail(1) and the output of a logic AND gate 200 having as its inputs the signal S_Vib(1)N(Y) (whatever Y) and the signal S_EGT(1). The signal S_Eng(1) is thus set to 1 when, for the engine 1, the values of the amplitudes of the vibrations of a rotor and the temperature of the exhaust gasses are abnormal OR when an anomaly on a mechanical part is detected.

Figure 4:
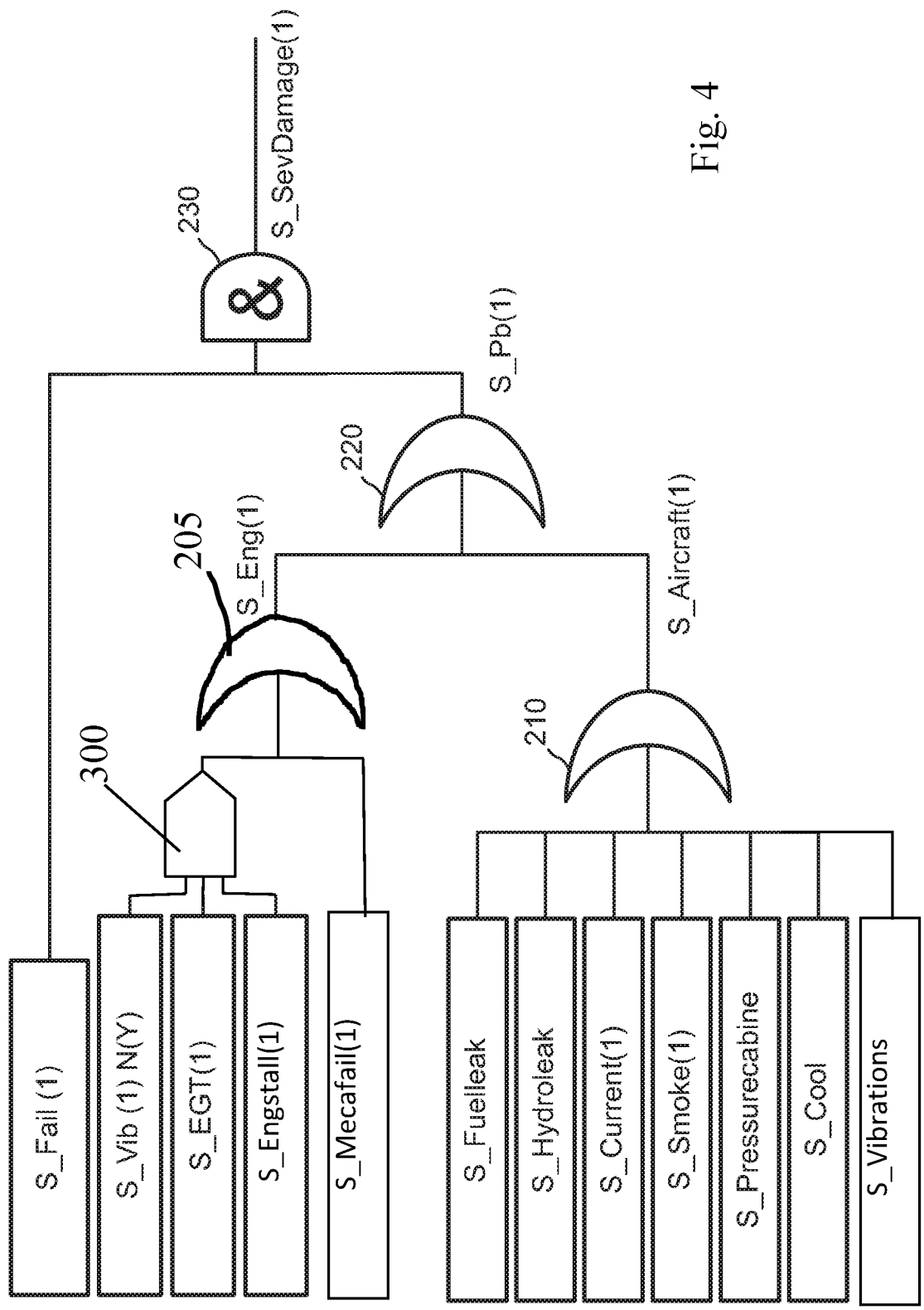

Turning to FIG. 4, another embodiment of Boolean logic implemented by the monitoring device 50 according to the present invention is shown. The features of FIG. 4 shown and described above with respect to the other figures have the same reference numerals and identifiers.

In one difference from the embodiment of FIGS. 2 and 3, FIG. 4 depicts a logic MAJ gate 300 (majority gate) used with the signal S_Vib(1)N(Y) (whatever Y) and the signal S_EGT(1), which are the same as discussed above, and with a signal S_Engstall(1). The signal S_Engstall(1) corresponds to a signal from the engine controller when an engine stall (also know as a compressor stall) has been detected. An engine stall, or compressor stall, is a local disruption of the airflow in the compressor of a gas turbine or turbocharger. The stall may create the complete disruption of the airflow through the compressor, referred to as a compressor surge.

As is known, a compressor in an engine will only pump air in a stable manner up to a certain pressure ratio. Above this value, the airflow becomes unstable. There are a variety of things that occur during the operation of an engine which can lower the surge pressure ratio or can raise the operating pressure ratio. When there is no difference between the surge pressure ratio and the operating pressure ratio, a compressor stage can stall or surge. The engines 1, 2 typically include various sensors which can detect when an engine stall has occurred.

Accordingly, the signal S_Eng(1) in the embodiment of FIG. 4 is the output of the logic OR gate 205 having as its inputs the signal S_Mecafail(1) and the output of with the logic MAJ gate 300 having as its inputs the signal S_Vib (1)N(Y) (whatever Y), the signal S_EGT(1), and the signal S_Engstall(1). The signal S_Eng(1) is thus set to 1 when, for the engine 1, an anomaly on a mechanical part is detected OR at least two of the following are met: the values of the amplitudes of the vibrations of a rotor exceed a value, the temperature of the exhaust gasses are abnormal, and a stall of the engine 1 has been detected.

Turning the signal S_Aircraft(1) in the embodiment of FIG. 4, this embodiment includes a signal S_Vibrations which represents a signal associated with aircraft vibrations that does not come from an engine controller. When there are vibrations of the engine, these vibrations of the engine induce vibrations of the aircraft. The vibrations induced on the aircraft can be measured without requiring a sensor on the engine and without requiring transmitting this information from an engine controller to an aircraft computer. For example, an accelerometer is an existing inertial device of the aircraft, for example an Inertial Reference System (IRS), which communicates with the aircraft computer, which in turn provides the signal S_Vibrations when the detected vibrations have an amplitude which exceeds a predetermined level of vibrations.

The diagnostic device 40 has been described as collecting the values of different parameters resulting from measurements carried out by sensors associated with different onboard systems of the aircraft A. Without departing from the context of the present invention, the diagnostic device 40 could collect solely the value of a single parameter resulting from a single measurement carried out by a sensor associated with an onboard system of the aircraft A.

The above description relates to an example implementation of the invention for a twin-engine aircraft, without departing from the context of the present invention, the invention could be implemented on an aircraft comprising more engines, such as, for example, a four-engine aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for monitoring the engines of an aircraft comprising
at least two engines,
a central processing unit associated with each engine and configured to measure a temperature of exhaust gases of the engine, an amplitude of vibrations of at least one rotor of the engine, and a power of the engine, wherein each central processing unit associated is configured to detect a mechanical anomaly of the engine,
a plurality of onboard systems,
a diagnostic device for the onboard systems of the aircraft configured to measure a value of at least one parameter of at least one onboard system of the aircraft,
a display screen, and
a monitoring device connected to each of the central processing units, to the diagnostic device, and to the display screen, the monitoring device configured to:
determine a condition A is met when the value of the at least one parameter of the at least one onboard system of the aircraft is outside of an acceptable range of values; and
determine a condition B is met:
when the mechanical anomaly of the engine is detected, or
when at least two of the following are met:
the temperature of the exhaust gases of the engine is in excess of a predetermined value,
the amplitude of vibrations of at least one rotor of the engine is in excess of a predetermined value, and
a compressor stall of the engine is detected,
the method being implemented by the monitoring device, and comprising, for each engine, the steps:
detecting a loss of power of one of the engines;
detecting when the condition A is met and the condition B is met;
generating, by the monitoring device, a signal indicative of severe damage of the one of the engines when a loss of power is detected and the condition A or the condition B is detected; and,
displaying on the display screen a message, transmitted by the monitoring device, indicative of the severe damage of the one of the engines.

2. The method of claim 1 wherein the plurality of onboard systems comprises at least one of nacelles of the aircraft, a fuel circuit, a hydraulic circuit, a cabin of the aircraft, a pneumatic circuit of the aircraft, or an electronic power circuit of the aircraft.

3. The method of claim 1 wherein the least one onboard system of the aircraft comprises a fuel circuit and wherein the at least one parameter comprises a liquid flow rate or a liquid level.

4. The method of claim 1 wherein the least one onboard system of the aircraft comprises an electronic power circuit and wherein the at least one parameter comprises a voltage level or a current level.

5. The method of claim 1 wherein the least one onboard system of the aircraft comprises nacelles for the aircraft and wherein the at least one parameter comprises a temperature inside the nacelles.

6. The method of claim 1 wherein the least one onboard system of the aircraft comprises a cabin of the aircraft and wherein the at least one parameter comprises a pressure of the cabin.

7. The method of claim 1 wherein the least one onboard system of the aircraft comprises a pneumatic generation circuit of the aircraft and wherein the at least one parameter comprises a temperature in the pneumatic generation circuit.

8. The method of claim 1 wherein the at least one parameter comprises a position of flaps of the aircraft.

9. The method of claim 1 wherein the at least one parameter comprises a position of leading edge slats of the aircraft.

10. The method of claim 1 wherein the at least one parameter comprises a position of a thrust reverser of the engine.

11. The method of claim 1 wherein the at least one parameter comprises a vibration of the aircraft.

12. The method of claim 1 wherein the aircraft comprises two engines.

13. The method of claim 1 wherein the aircraft comprises four engines.

* * * * *